US011243970B2

(12) United States Patent
D'Amore et al.

(10) Patent No.: US 11,243,970 B2
(45) Date of Patent: Feb. 8, 2022

(54) INTELLIGENT DATABASE CONNECTION MANAGEMENT

(71) Applicant: PayPal, Inc., San Jose, CA (US)

(72) Inventors: Giuseppe D'Amore, Austin, TX (US); Krishna Kumar Rangineni, Austin, TX (US); Venugopalsamy Govindarajan, Austin, TX (US)

(73) Assignee: PayPal, Inc., San Jose, CA (US)

( * ) Notice: Subject to any disclaimer, the term of this patent is extended or adjusted under 35 U.S.C. 154(b) by 659 days.

(21) Appl. No.: 15/639,056

(22) Filed: Jun. 30, 2017

(65) Prior Publication Data

US 2019/0005047 A1 Jan. 3, 2019

(51) Int. Cl.
| | | |
|---|---|---|
| *G06F 16/25* | (2019.01) | |
| *H04L 29/08* | (2006.01) | |
| *G06F 13/10* | (2006.01) | |
| *G06F 17/10* | (2006.01) | |

(52) U.S. Cl.
CPC .......... *G06F 16/252* (2019.01); *G06F 13/102* (2013.01); *G06F 17/10* (2013.01); *H04L 67/1008* (2013.01)

(58) Field of Classification Search
CPC ........................ G06F 16/252; H04L 67/1008
See application file for complete search history.

(56) References Cited

U.S. PATENT DOCUMENTS

| | | | | |
|---|---|---|---|---|
| 10,833,958 | B2* | 11/2020 | Barghouthi | H04L 67/10 |
| 2003/0101009 | A1* | 5/2003 | Seem | H02J 3/00 |
| | | | | 702/61 |
| 2012/0173477 | A1* | 7/2012 | Coutts | G06F 16/217 |
| | | | | 707/602 |
| 2015/0134839 | A1* | 5/2015 | Kasten | H04L 67/1008 |
| | | | | 709/227 |
| 2016/0065421 | A1* | 3/2016 | Barghouthi | H04L 67/10 |
| | | | | 707/783 |
| 2016/0092271 | A1* | 3/2016 | Jain | H04L 65/1069 |
| | | | | 718/1 |
| 2018/0019922 | A1* | 1/2018 | Robison | G06F 16/25 |

* cited by examiner

*Primary Examiner* — Nam T Tran
(74) *Attorney, Agent, or Firm* — Kowert, Hood, Munyon, Rankin & Goetzel, P.C.

(57) ABSTRACT

According to an aspect of an embodiment of the present disclosure a method of database connection management includes measuring a pattern of database connection use between a database and a client application. The pattern may include a number of database connections used by the client application under multiple conditions and a number of database connections in a connection pool under the plurality of conditions. The method may include identifying a first condition under which an increase in the number of database connections in the connection pool results in a decrease in connection delay. In response to existence of the first condition, the method may include adding a new database connection to the connection pool such that the new database connection is available to the client application in advance of a connection request for the new database connection.

20 Claims, 8 Drawing Sheets

INTELLIGENT DATABASE CONNECTION MANAGEMENT

FIELD

Embodiments of the present disclosure relate to intelligent database connection management.

BACKGROUND

In some computing systems or networks of computing systems, client application systems may communicate with database systems via database connections. The database connections may be established by supplying a connection string to a driver or a provider. The connection string may provide an address of the database system. After the database connection is established, it can be opened and closed relatively easily. However, it is time consuming to establish a new database connection. Accordingly, connection pools may be implemented. Database connections may be established and stored in the connection pools. When needed, a client application system may request a database connection. Instead of establishing a new database connection, the client application system may be assigned an existing database connection from the pool. After use, the client application system may return the database connection to the connection pool.

BRIEF DESCRIPTION OF THE DRAWINGS

Example embodiments will be described and explained with additional specificity and detail through the use of the accompanying drawings in which.

DETAILED DESCRIPTION

Figure 1:
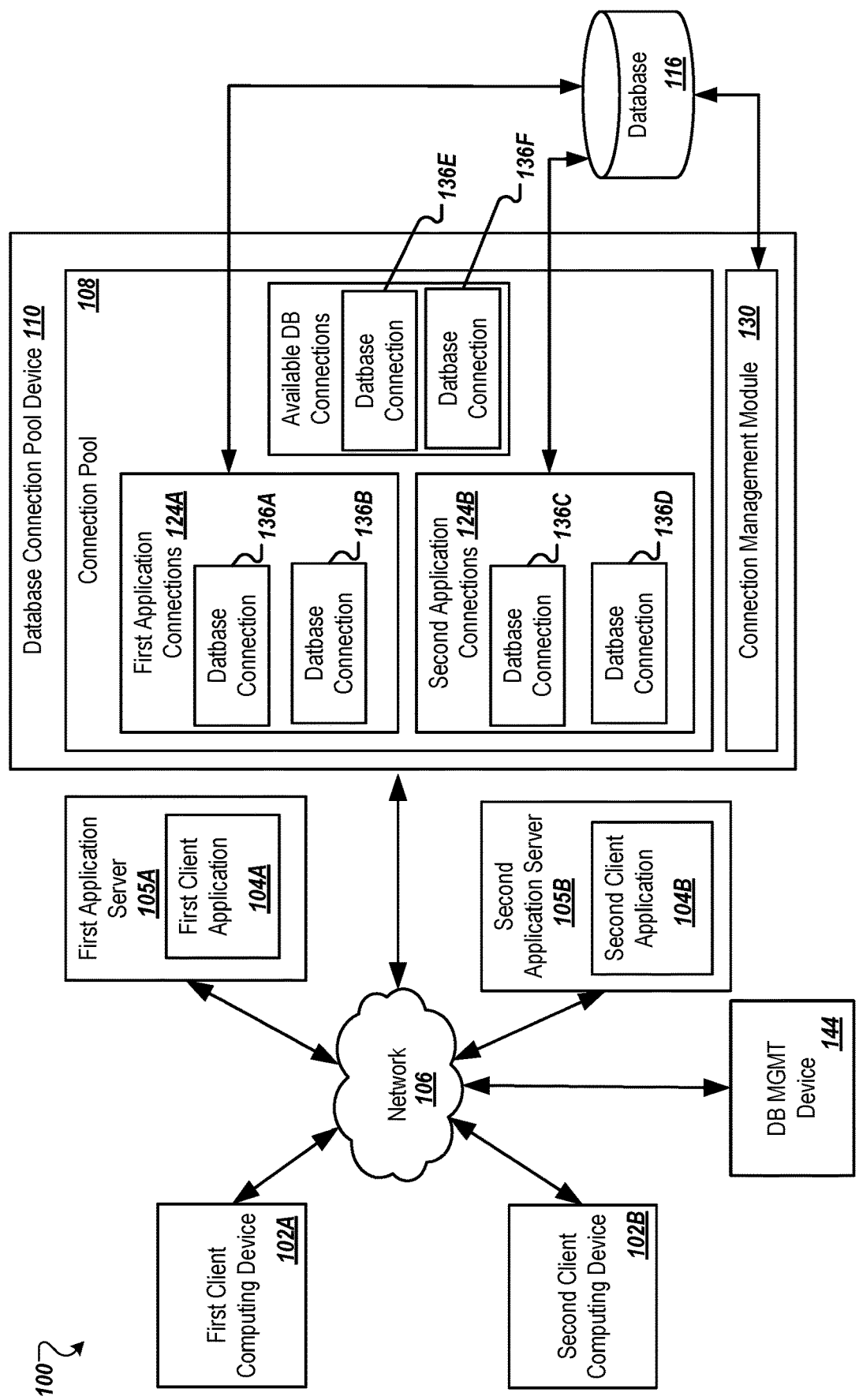
FIG. 1 is a diagram illustrating an example database connection management system (system)

Database connections connect a client application to a database server or database. Database connections can be created or opened and closed or pruned. The database connections may include a network location of a database, an identifier or name of the database, configuration that may be used in communication with the database, or some combination thereof. Specific syntax may vary based on the database accessed and protocols implemented in the database connection. A JAVA®-based database connection and data structure used for creating the database connection is available at https://docs.oracle.com/javase/tutorial/jdbc/basics/connecting.html#db_connection_url. This example database connection includes a host name or address of the database, a name, a standby database, and some configurations used in the database connection.

Connection pools are a cache of database connections that have been created but are not currently being used by a client application. Some additional details of connection pools and data structures included therein may be found in Kircher, Michael & Jain, Prashant; POOLING, 2002 Corp. Tech. Siemens AG. available at http://www.kircher-schwanninger.de/michael/publications/Pooling.pdf, which is incorporated herein by reference in its entirety.

There are many connection pool libraries available, both open source and commercial. The standard options for a connection pool are 1) a minimum database connections to create at startup and maintain, 2) a maximum number of database connections to allow, and 3) how long to keep an idle database connection before destroying/pruning the idle database connection. An example connection pool is the Weblogic Application Server by Oracle® that provides a connection pool.

The minimum number and the maximum number may be set and static. The minimum number of database connections is maintained during periods of low traffic when the database connections are not used. The number of database connections may be increased in response to connection requests communicated from the client application until the maximum number is reached. If there is a database connection available in a connection pool, it may be assigned to the client application in response to the connection request. If there is not an available database connection, the client application waits until the database connection is established and added to the connection pool. Additionally, if the maximum number is reached and an additional connection request is received, the client application waits until a database connection is unused between the client application and the database.

These database connection management systems may suffer from several inefficiencies. For instance, when there is not a database connection available in the connection pool or the maximum number of database connections is in use, the client application waits. In particular, in high availability-multi-node distributed systems, the database bears the greatest resource demands. In these and other systems, multiple client applications may connect to the database. Establishment of a new database connection is an expensive operation with respect to time. Often, establishment of the new database connection may consume more time than all other processes being performed during the course of a transaction. Additionally, the minimum number and the maximum number may be static. Accordingly, computing resources may be allocated to maintaining the minimum number of database connections, which may be unused. Currently in many global operations production environments, the database servers run at 94% memory usage.

In current connection pools, dynamic management of the connection pools does not occur. For instance, some computing codes that support connection pools purposefully enforce a size of the connection pool during startup. The computing codes include a connection pool library provides the ability to get the pool size, a number of active database connections, a number of idle connections in the connection pool, but not the ability to change these in real-time and in response to current conditions.

Accordingly, embodiments described in the present application relate to intelligent database connection management. For example, some embodiments include a device or method in which an existence of a particular condition is detected. The particular condition relates to a state or circumstance of a system in which an inefficiency may be introduced into a database connection configuration between a client application and a database. In response to detection of the particular condition, a database connection configuration may be modified. Modification of the database connection configuration may include a change to a number of database connections in a connection pool and/or a change in a number of database connections between the client application and the database. In particular, a database connection may be added to or removed from the connection pool, a maximum number of database connections may be changed, or a minimum number of database connections may be changed. The particular conditions may include a particular time, a first connection request of a multiple anticipated connection requests, and a number of database connections in the connection pool, for instance.

The changes to the number of database connections in the connection pool and between the client application and the database may reduce the time involved in establishing a new database connection (hereinafter "connection delay") and/or may reduce computing resources used to maintain unused database connections.

Thus, the intelligent database connection management described in the present disclosure provides a computer-based solution that reduces or eliminates the inefficiencies described above. Thus, the embodiments provide a technical solution to these inefficiencies in the technological field of database management.

One or more example embodiments are explained with reference to the accompanying drawings.

FIG. 1 is a diagram illustrating an example database connection management system (system) 100 in accordance with one or more embodiments of the present disclosure. The system 100 may be configured to manage database connections 136A-136F (generally database connection 136 or database connections 136) and configurations thereof. The database connections 136 may be managed in a connection pool 108 and between client applications 104A and 104B (generally, client application 104 or client applications 104) and a database 116. For example, a number of database connections 136A-136D between the client applications 104 and the database 116 may be managed in the system 100. Additionally, a number of database connections 136E and 136F in a connection pool 108 may be managed in the system 100. Some examples of management of the database connections 136 may include establishing a new database connection 136, adding a database connection 136 to the connection pool 108, removing a database connection 136 from the connection pool 108, increasing and decreasing a maximum number of database connections 136 between the client application 104 and the database 116, increasing and decreasing a minimum number of database connections 136 between the client application 104 and the database 116, or combinations thereof.

Management of the database connections 136 may be based on one or more particular conditions that may exist in the system 100. The management of the database connections 136 may occur responsive to detection or existence of the particular conditions. For instance, the particular condition may include a time of day (e.g., at about 5:55 PM EST). In response to existence of the particular condition, one or more available database connections 136E or 136F may be established and added to the connection pool 108. The available database connections 136E or 136F may be available in advance of a need for the database connection 136 by the client application 104.

Management of the database connection 136 may increase efficiency of the system 100. For instance, the changes to the number of database connections 136 in the connection pool 108 may reduce a connection delay. The connection delay may result from the client applications 104 communicating a request for a database connection 136 (hereinafter a "connection request") and there being no database connections 136E or 136F available in the connection pool 108. The connection delay may also occur when a maximum number of database connection 136 are in use between the client applications 104 and the database 116 and the client application 104 requests an additional database connection 136.

Additionally, the changes to the number of the database connections 136 may reduce computing resources allocated to unused database connections 136 in the connection pool 108 or between the database 116 and the client applications 104. Unused database connections 136 may be present in the connection pool 108 following use by the client applications 104 or in anticipation of multiple connection requests. Unused database connections may also exist between the client applications 104 and the database 116 to attempt to avoid a connection delay following a large number of connection requests. Accordingly, the system 100 may provide technical improvements to connection database management. In particular, the system 100 may reduce connection delays and/or reduce computing resources allocated to unused database connections 136.

The system 100 may include the client applications 104, application servers 105A and 105B (generally, application server 105 or application servers 105), client computing devices 102A and 102B (generally, client device 102 or client devices 102), a database management device 144, a database connection pool device 110 (hereinafter, "pool device 110"), and the database 116. The client applications 104, the client devices 102, the pool device 110, the database management device 144, the database 116, or some subset thereof may communicate via the network 106. Some details of each of the client applications 104, the client devices 102, the pool device 110, the database management device 144, the database 116, and the network 106 are described in the following paragraphs.

The network 106 may include any arrangement of systems and devices configured to communicate data and information in the system 100. Some examples of the network 106 may include a wired network, a wireless network, or any combination thereof. The network 106 may include any suitable configuration or configurations including a star configuration, token ring configuration, or other configurations. The network 106 may include a local area network (LAN), a wide area network (WAN) (e.g., the Internet), and/or other interconnected data paths across which multiple devices may communicate. In some embodiments, the network 106 may include a peer-to-peer network. The network 106 may also be coupled to or include portions of a telecommunications network that may enable communication of data in a variety of different communication protocols. In some embodiments, the network 106 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The database 116 may include any device or system that includes non-transitory computer-readable storage media on which data and information is at least temporarily stored. The database 116 in the system 100 may be accessible to the client applications 104 via database connections 136. The database connections 136 may enable communication of commands, responses, data and information, etc., between the database 116 and the client applications 104. Some examples of the database 116 may include an ORACLE® database, an IBM® DB2®, a MySQL database, a postgres database, a Microsoft® Sql Server®, or another suitable database. In FIG. 1, the database 116 is depicted separately from the pool device 110 and the application servers 105. In some embodiments, the database 116 may be hosted by the pool device 110 or the application servers 105.

The client devices 102 may include any processor or hardware computing system with network capabilities. In the system 100, the client devices 102 may interface with the client applications 104 via the network 106. For instance, a user or another entity may operate the client device 102, which may communicate data and information with one or both of the client applications 104. The amount or level of interface between the client devices 102 and the client applications 104 may vary. For instance, under certain conditions, there may be a greater amount of traffic between the client devices 102 and one or both of the client applications 104 than under other conditions. For instance, during periods of high traffic, both of the client devices 102 may interface with the first client application 104. The high traffic may include multiple sets of data communicated between the client devices 102 and the client applications 104. In contrast, during periods of low traffic, neither of the client devices 102 may interface with the client applications 104.

High traffic and low traffic may be quantified related to an overall capacity of the system 100. For example, the high traffic and the low traffic may be quantified relative to a percentage of the overall computing capacity of the system 100. High traffic may include conditions in which above about 80% of overall computing capacity are in use and below about 20% of the overall computing capacity is available. Low traffic may include conditions in which below about 20% of overall computing capacity is in use and above 80% of the overall computing capacity is available.

The client applications 104 may be loaded and/or hosted on the application servers 105. The application servers 105 may include any processor or hardware based server with networking capabilities. The application servers 105 are communicatively coupled to the client devices 102 via the network 106 such that information and data may be communicated there between. Information and data communicated to the client applications 104 from the client devices 102 may be received by the application servers 105 and processed by the client applications 104. Similarly, data and information communicated to the client devices 102 from the client applications 104 may be communicated via the application servers 105 and the network 106.

The client applications 104 may include any computer programming based application that is configured to interface with the client devices 102 and with the database 116. The client applications 104 may be configured to execute commands on the database 116. For example, the client applications 104 may access information stored on the database 116 for use in a process. Additionally, the client application 104 may communicate information to the database 116 for storage. Additionally still, the client applications 104 may communicate commands that affect data stored in the database 116.

Some examples of the client applications 104 may include a web-based application such as enterprise applications (e.g., dispute applications, customer support applications, risk applications, customer feedback applications, online market applications, transactional applications, banking applications, etc.). Additionally, the client applications 104 may include local applications. In these embodiments, the client device 102 and the application server 105 may be a single device or may be connected via a local network or local portion of the network 106.

The client applications 104 may execute multiple commands on the database 116, which may involve one or more of the database connections 136. For instance, in FIG. 1, the connection pool 108 may include first application connections 124A between the first client application 104A and the database 116 and second application connections 124B between the second client application 104B and the database 116. The number of database connections 136 may vary in each of the first application connections 124A and the second application connections 124B (generally, application connection 124 or application connections 124). For example, during periods of high traffic between the client devices 102 and the client applications 104, the number of database connections 136 in the first application connections 124A and the second application connections 124B may increase. Additionally, during periods of low traffic between the client devices 102 and the client applications 104, the number of database connections 136 in the first application connections 124A and the second application connections 124B may decrease.

Additionally, the client applications 104 may communicate connection requests to the pool device 110. For instance, in circumstances in which a need for database connections exceeds the number of database connections 136 in the first application connections 124A, the first client application 104A may communicate a connection request to the pool device 110. In response, the pool device 110 may assign one of the available database connections 136E and 136F to the first application connections 124A such that the first client application 104A can use the database connections 136E and 136F.

The pool device 110 may include any processor or hardware-based device that is configured to host and manage the connection pool 108 and the database connections 136 between the client applications 104 and the database 116. In some embodiments, the pool device 110 may be an independent device that is communicatively coupled to the database 116 and/or the application servers 105 via the network 106. Additionally, in some embodiments, the pool device 110 or functionalities attributed thereto may be loaded and hosted on the application servers 105. Additionally still, in some embodiments, the pool device 110 may include a device on which the database 116 is included. In the following paragraphs, the pool device 110 is described as an independent device. However, it may be understood with the benefit of this disclosure that the pool device 110 or at least some of the functionalities attributed thereto may be performed by a module included on the application server 105 or another device.

The pool device 110 may host the connection pool 108. The connection pool 108 may include a cache of the database connections 136. In the connection pool 108, some of database connections 136A-136D are assigned to or used in communication of data and information between the client applications 104 and the database 116. Additionally, in the connection pool 108, some of the database connections 136E and 136F are available. The available database connections 136E and 136F may be assigned to the first application connections 124A or the second application connections 124B in response to a connection request. Additionally, following use of the database connections 136 by the client applications 104, the database connections 136 in the first application connections 124A or the second application connections 124B may be made available in the connection pool 108.

In the system 100 of FIG. 1, the client applications 104 may be communicatively coupled to the connection pool 108. In some embodiments, more than two client applications 104 may be communicatively coupled to the database 116 via the connection pool 108. Additionally, in some embodiments, one of the client applications 104A or 104B may be communicatively coupled to the connection pool 108.

The pool device 110 may be configured to reduce or eliminate connection delay and to reduce or eliminate computing resources allocated to unused database connections. In some embodiments, the pool device 110 may include a connection management module 130.

The connection management module 130 may be implemented using hardware including a processor, a microprocessor (e.g., to perform or control performance of one or more operations), a field-programmable gate array (FPGA), or an application-specific integrated circuit (ASIC). In some other instances, the connection management module 130 may be implemented using a combination of hardware and software. Implementation in software may include rapid activation and deactivation of one or more transistors or transistor elements such as may be included in hardware of a computing system (e.g., the pool device 110 or the application servers 105). Additionally, software defined instructions may operate on information within transistor elements. Implementation of software instructions may at least temporarily reconfigure electronic pathways and transform computing hardware.

The connection management module 130 may be configured to manage and modify a database connection configuration between the client applications 104 and the database 116. In some embodiments, the connection management module 130 may be configured to detect existence of one or more particular conditions that result in an introduction of an inefficiency (e.g., connection delay and/or computing resources allocated to unused databased connections) in database connection configuration between the client application 104 and the database 116. For instance, the connection management module 130 may be configured to detect existence of the one or more particular conditions in real time or substantially real time as traffic is communicated between the client devices 102, the client applications 104, and the database 116.

In response to existence of the one or more particular conditions, the connection management module 130 may be configured to modify the database connection configuration. For instance, the connection management module 130 may change a number of database connections 136 in a connection pool 108 or a number of database connections 136 between the client applications 104 and the database 116. Changes to the number of database connections 136 may be configured to avoid the introduction of the inefficiencies.

The one or more particular conditions may include a first condition under which an increase in the number of database connections 136E and 136F in the connection pool 108 results in a decrease in connection delay, a second condition at which a decrease in the number of database connections 136E and 136F in the connection pool 108 results in a decrease in computing resources used to maintain unused database connections in the connection pool 108, a third condition in which an increase in the number of database connections 136A-136D between the client applications 104 and the database 116 results in a decrease in the connection delay, and a fourth condition in which a decrease in the number of database connections 136A-136D between the client applications 104 and the database 116 results in a decrease in computing resources used to maintain unused database connections 136A-136D between the client applications 104 and the database 116.

The particular conditions may relate to or be indicative of a state or a circumstance of the system 100 during which an inefficiency is introduced to the system 100. Additionally, the particular conditions may be specific to one or both of the client applications 104. Some examples of the particular conditions may include a particular time of day, a particular time of year, a number of received connection requests, a number of database connections 136 available in the connection pool 108, a computing resource allocated to the database connections 136 between the database 116 and the client applications 104, other particular conditions or some combination thereof. The changes to the number of database connections 136 may include adding a new database connection 136 to the connection pool 108 such that the new database connection 136 is available to the client applications 104 in advance of a connection request for the new database connection 136, removing an unused database connection 136 from the connection pool 108, increasing or decreasing a maximum number of database connections 136 between the database 116 and the client applications 104, increasing or decreasing a minimum number of database connections 136 between the database 116 and the client applications 104.

In some embodiments, the connection management module 130 may be configured to measure a pattern of database connection use. The pattern of database connection use may include historical data regarding the number of database connections 136 between the database 116 and the client applications 104 under multiple conditions. The pattern of database connection use may include, for example, a number of database connections 136 used by the client applications 104 under the multiple conditions and a number of database connections 136 in the connection pool 108 under the multiple conditions.

In these and other embodiments, the connection management module 130 may be configured to identify the particular conditions under which inefficiencies are introduced into the system 100 based on the measured pattern. For example, the measured pattern may indicate that after 5:00 PM each Friday until 10:00 AM each Saturday, the number of database connections 136 used between the second client application 104B and database 116 is five or fewer. In this example, a minimum number of database connections 136 maintained between the second client application 104B and the database 116 may be ten. Accordingly, the connection management module 130 may identify that maintenance of the minimum number of database connections 136 between the second client application 104B and the database 116 as a particular condition that is introducing an inefficiency (e.g., a waste of computing resources) into the system 100.

In addition to measurement of the patterns or as an alternative to the measurement of the patterns, the connection management module 130 may receive user input from the database management device 144. For instance, in some embodiments, the connection management module 130 may measure the pattern and/or identify particular conditions concurrently with receipt of user input from the database management device 144. In other embodiments, the connection management module 130 may only receive user input or may only measure the pattern.

In embodiments in which the user input is received from the database management device 144, the user input may be used by the connection management module 130 to manage the database connections 136 in the system 100. For instance, the user input may identify the one or more particular conditions, may specify changes triggered by the particular conditions, may update the particular conditions, may update changes or modifications triggered by the particular conditions, etc.

In some embodiments, management of the database connections 136 by the connection management module 130 may be performed according to an algorithm. The algorithm may receive data and information related to the state of the system 100 as input. The input may be indicative of the existence or absence of the particular condition. In response to the input indicative of existence of the particular condition, the algorithm may change the number of database connections 136 as described elsewhere in the present disclosure.

The algorithm may be preset. Preset algorithms may be configured with the one or more particular conditions and/or the one or more changes triggered by the particular conditions. For instance, the algorithm may be configured to maintain a minimum number of database connections 136 available in the connection pool 108. The particular condition in this example is the number of database connections 136 in the connection pool 108 dropping below a preconfigured number (e.g., two). Accordingly, execution of the algorithm may result in monitoring a number of database connections 136 in the connection pool 108. In response to the number of database connections 136 in the connection pool 108 dropping below the preconfigured number, one or more new database connections 136 may be added to the connection pool 108.

Some other example algorithms that may be implemented by the connection management module 130 may include an algorithm configured to manage a number of database connections 136 according to time (e.g., time of day or time of year), an algorithm configured to maintain a number of database connections 136 in the connection pool 108 to include a minimum number plus some buffer database connections, an algorithm configured to maintain the number of database connections 136 between a minimum number of database connections 136 and a maximum number of database connections 136. Some details of a subset of these algorithms are described with reference to FIGS. 2-4.

The algorithm may be generated or updated according to the user input received from the database management device 144. Additionally, the algorithm may be generated or updated according to measured patterns of database connection use and particular conditions identified therefrom.

In some embodiments, the algorithm and/or the user input may be updated or modified based on machine learning, predictive analysis, pattern recognition, algorithm chaining (backwards and forwards), or some combination thereof. For instance, an algorithm may be implemented to identify a particular condition that introduces an inefficiency into the system 100. The algorithm may specify a particular corrective action (e.g., increase a number of database connections) that reduces the inefficiency and may execute an instruction that implements the corrective action.

The connection management module 130 may continue to monitor performance in the system 100 following implementation of the algorithm. The connection management module 130 may then implement machine learning on data that pertains to the performance of the system 100. The machine learning may review the performance of the system 100 and suggest or implement modifications to the particular corrective action, refinements to the particular condition, etc. The algorithm may be updated using the machine learning, which may improve efficiency of the system 100.

Additionally or alternatively, the connection management module 130 may implement predictive analysis of data that pertains to the performance of the system 100. The predictive analysis may be configured to predict occurrences of the particular conditions and/or impact on the system 100. For instance, the predictive analysis may correlate factors that result in the inefficiencies and steps taken to mitigate the inefficiencies. The factors may be related to the particular client application 104. For instance, the predictive analysis may correlate better than expected economic conditions with a larger demand for an online market client application 104.

Additionally, the connection management module 130 may implement algorithm chaining. The algorithm chaining is based on inferential reasoning, which may test or affirm effectiveness of the algorithm(s) that are used to identify the particular condition or specify the corrective action. For example, the algorithm chaining may infer new data that pertains to future or potential performance of the system 100 from the data gathered during implementation of the algorithm. The inferred data may be used to modify the algorithm.

In some embodiments, the connection management module 130 or some subset of the functionality attributed thereto may be configured as a plug-in module. In these and other embodiments, the connection management module 130 may be added to a database connection management portion of the client applications 104 or a system hosting the database 116. The connection management module 130 may be configured for a particular type of client application 104 and/or a particular type of database 116, which may increase benefits of the plug-in module. The plug-in module may be configured with an application programming interface (API). The API may enable customization of the connection management module 130.

An example API may include one or more generic functions that may be implemented as computing code or software instructions. The generic functions may include a load function, an unload function, and a get function that enable interface between the connection management module 130 implemented as a plugin and the client application 104.

The API may further define functions that query and/or control a number of current database connections 136, a maximum number of database connections 136, a number of idle database connections 136, an idle timeout of database connections 136 in the pool device 110, or some combination thereof.

Modifications, additions, or omissions may be made to the system 100 without departing from the scope of the present disclosure. Specifically, the system 100 may include one or more client devices 102, one or more application servers 105, one or more client applications 104, one or more databases 116, one or more pool devices 110, one or more database management devices 144, or any combination thereof. Moreover, the separation of various components in the embodiments described herein is not meant to indicate that the separation occurs in all embodiments. It may be understood with the benefit of this disclosure that the described environment components may be integrated together in a single component or separated into multiple components. For example, the database 116, the pool device 110, and one of the application servers 105 may be included in a single hardware-based server.

Figure 2:
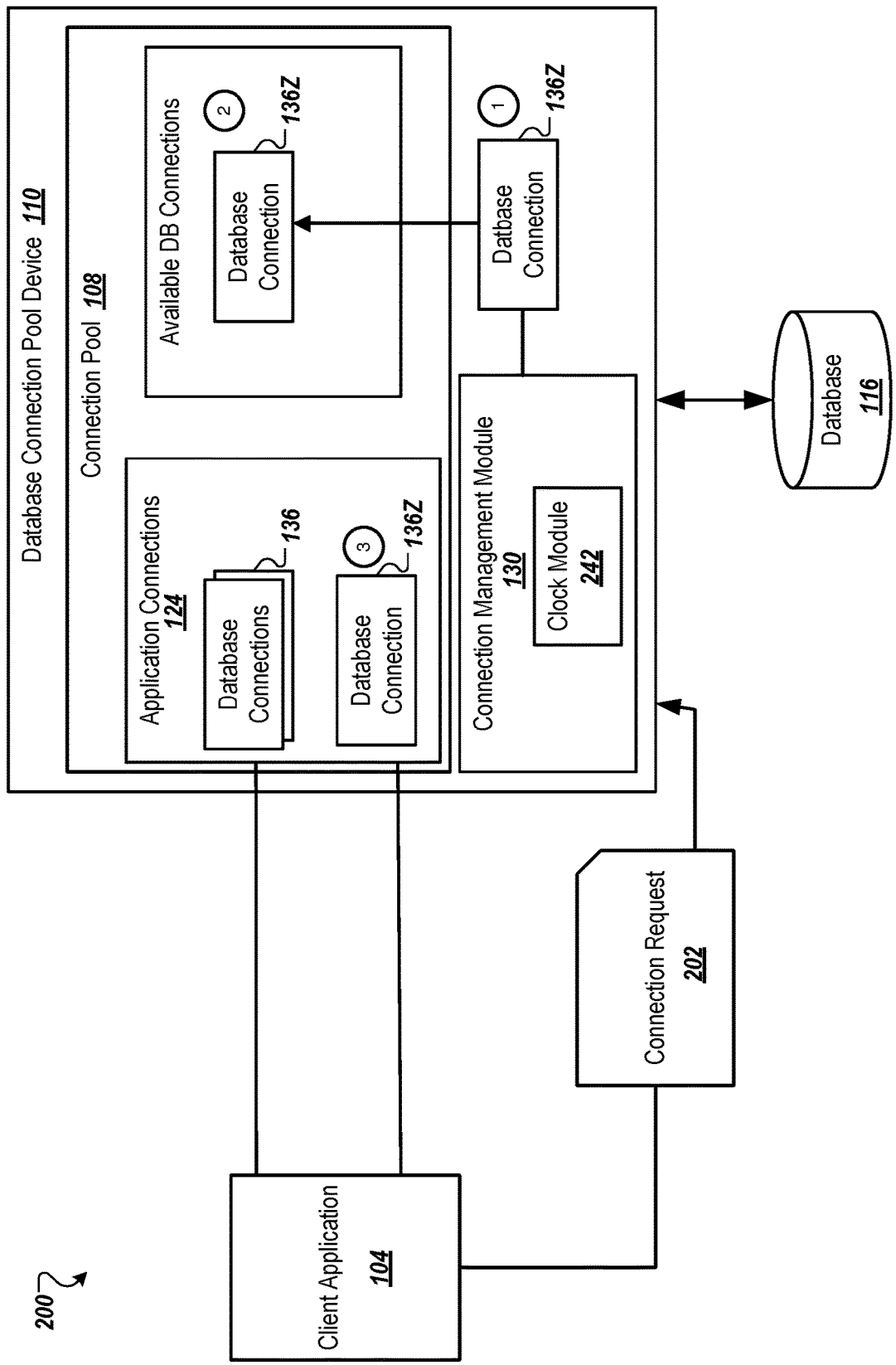
FIG. 2 is a diagram of an example process of changing a number of database connections in a connection pool that may be implemented in the system of FIG. 1.

FIG. 2 is a diagram of an example process 200 of changing a number of database connections 136 in the connection pool 108 in accordance with at least one embodiment described in the present disclosure. The process 200 of FIG. 2 may be implemented in the system 100 of FIG. 1. In FIG. 2, multiple components (e.g., 104, 124, 130, 136, 108, and 110) are included that were described with reference to FIG. 1. The descriptions of these components are not repeated with reference to FIG. 2.

The process 200 is described in which a number of database connections 136 available in the connection pool 108 are changed due to the existence of one or more particular conditions that may be time-based or related to time. Specifically, in the process 200 of FIG. 2, the number of database connections 136 in the connection pool 108 may be increased. An increase in the number of database connections 136 may be triggered by a first particular condition that may be time-based. For instance, the first particular condition may trigger establishment and addition of a database connection 136Z to the connection pool 108. The first particular condition may be related to time. The increase in the number of database connections 136 in the connection pool 108 may occur prior to the client application 104 communicating a connection request 202. Thus, the process 200 may be configured to anticipate database connection use of the client application 104, which may reduce or eliminate connection delay.

Additionally, the number of database connections 136 in the connection pool 108 and/or between the database 116 and the client application 104 may be decreased. A decrease in the number of database connections 136 in the connection pool 108 and/or between the database 116 and the client application 104 may be triggered by a second particular condition that may be time-based. The decrease in the number of database connections 136 in the connection pool 108 and/or between the database 116 and the client application 104 may reduce computing resources allocated to maintenance of the database connections 136.

The connection management module 130 may include a clock module 242. The clock module 242 may be configured to measure time. For example, the clock module 242 may be configured to keep time on an ongoing basis (e.g., the current time and date) and may be configured to track time related to events. The clock module 242 may be configured to detect existence of the particular conditions that trigger changes to the number of database connections 136. Some examples of the particular conditions related to time may include a particular time of day (e.g., 5:00 PM EST), a particular time of year (e.g., Christmas Day), a particular interval before or following an event (e.g., 24 hours after a change in policy or publication of an event), a year, a particular interval (e.g., a duration of a sale or an offer is available) and a time of an event (e.g., a date of an election).

The connection management module 130 may communicate with the clock module 242. For example, in response to existence of the particular condition, the clock module 242 may communicate a signal to the connection management module 130 indicating that a particular condition exists. In response to the signal, the connection management module 130 may change the number of database connections 136 in the connection pool 108 and/or between the client application 104 and the database 116.

For instance, in response to a first signal indicating the existence of the first particular condition, the connection management module 130 may establish the database connection 136Z (at position 1 in FIG. 2). The connection management module 130 may add the database connection 136Z to the connection pool 108 (at position 2 in FIG. 2). The database connection 136Z may be available in the connection pool 108. In the process 200, the database connection 136Z may be available in the connection pool 108 prior to the connection request 202 being received by the pool device 110. Thus, the database connection 136Z may be assigned to the client application 104 (at position 3 in FIG. 2) immediately following receipt of the connection request 202. Establishment of the database connection 136Z in advance of the connection request 202 may reduce or eliminate connection delay.

In response to a second signal indicating the existence of the second particular condition, the connection management module 130 may be configured to remove the database connection 136Z from the application connections 124 or remove the database connection 136Z from the connection pool 108. For example, in response to the second signal, the connection management module 130 may move the database connection 136Z from the first application connections 124A and make the database connection 136Z available in the connection pool 108 (e.g., move from position 3 to position 2). Additionally, or alternatively, in response to the second signal, the connection management module 130 may remove the database connection 136Z from the connection pool 108 completely (e.g., dissolved from position 2). Removal of the database connection 136 from the first application connections 124A may reduce computing resources dedicated to maintenance of the database connection 136Z and/or may make the database connection 136Z available for another client application.

As an example, the client application 104 may include an online marketplace application. The client application 104 may be subject to increased traffic from client devices (e.g., the client devices 102 of FIG. 1) on Cyber Monday, for instance. In this example, Cyber Monday or times/dates associated with Cyber Monday may be the first particular condition. For instance, during Cyber Monday, there may have been instances of connection delay or there may be a potential for connection delay.

During the high traffic, the client application 104 may use an additional database connection 136. Accordingly, the clock module 242 may be configured to monitor for Cyber Monday. At some time before the beginning of Cyber Monday, the clock module 242 may communicate a signal to the connection management module 130 to establish the database connections 136Z and add the database connection 136Z to the connection pool 108. In particular, the connection management module 130 may establish the database connections 136Z and add the database connections 136Z to the connection pool 108 on the Sunday before Cyber Monday. Thus, the database connections 136Z are available as the connection request 202 is received from the client application 104 on Cyber Monday. Availability of the database connections 136 prior to receipt of the connection request 202 may reduce connection delays that may have occurred if the database connection 136Z was not available in the connection pool 108 prior to receipt of the connection request 202.

In this example, following Cyber Monday (e.g., on the Tuesday following Cyber Monday), the client application 104 may be subject to relatively low traffic. Accordingly, the clock module 242 may be configured to monitor for an end of Cyber Monday (e.g., midnight on Cyber Monday) and communicate a signal to the connection management module 130 towards the end of Cyber Monday. In response to the signal, the connection management module 130 may be configured to reduce the number of the database connections 136 in the connection pool 108 and/or the number of database connections 136 in the first application connections, which may reduce computing resources allocated to maintaining unused database connections 136.

Figure 3:
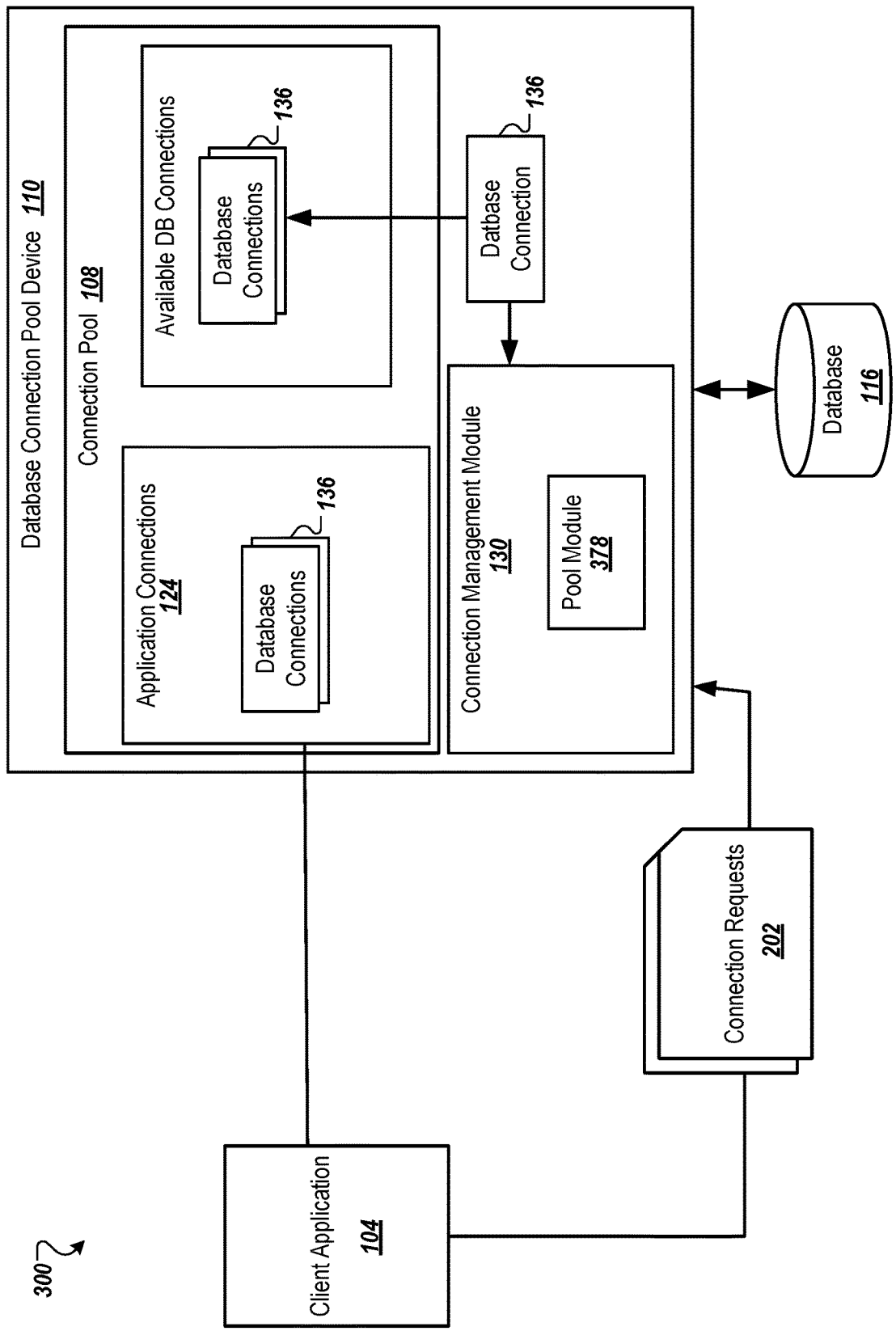
FIG. 3 is a diagram of another example process of changing a number of database connections in the connection pool that may be implemented in the system of FIG. 1.

FIG. 3 is diagram of another example process 300 of changing a number of database connections 136 in the connection pool 108 in accordance with at least one embodiment described in the present disclosure. The process 300 of FIG. 3 may be implemented in the system 100 of FIG. 1. In FIG. 3, multiple components (e.g., 104, 130, 202, 136, 108, and 110) are included that were described with reference to FIGS. 1 and 2. The descriptions of these components are not repeated with reference to FIG. 3.

In the process 300, the number of database connections 136 available in the connection pool 108 may be changed. The change in the number of database connections 136 may be in response to one or more particular conditions that are related to the connection pool 108 and availability of database connections 136 therein. For instance, the number of database connections 136 available in the connection pool 108 may be increased prior to an absence of available database connections 136 in the connection pool 108 or prior to the number of available database connections 136 dropping below a particular minimum.

Increasing the number of database connections 136 in the connection pool 108 may reduce or eliminate connection delay. Similarly, the number of database connections 136 available in the connection pool 108 may be decreased such that the number of available database connections 136 does not exceed a particular maximum.

The connection management module 130 may include a pool module 378. The pool module 378 may be configured to detect particular conditions that may trigger a change to the number of database connections 136 in the connection pool 108. Some examples of particular conditions related to the connection pool 108 may include a minimum number of database connections 136 available, a minimum number plus some buffer number of database connections 136 available, a maximum number of database connections 136 available, a rate at which the database connections 136 are being assigned to the client application 104, a rate at which the database connections 136 are being returned from the client application 104, etc.

For example, the pool module 378 may determine that a minimum number (e.g., one) of database connections 136 is available in the connection pool 108, which may be a particular condition. The pool module 378 may communicate a signal to the connection management module 130 indicating that the particular condition exists. In response, the connection management module 130 may establish and add a particular number (e.g., one, two, twenty, etc.) of database connections 136 to the connection pool 108.

The process 300 may be implemented in embodiments in which the client application 104 includes a dispute application or a similar application. In these types of applications, most of the time a single database connection 136 is sufficient. However, the dispute application may use a batch process. Accordingly, the connection requests 202 may periodically and suddenly increase. Accordingly, the process 300 may be implemented in which in response to the existence of a minimum number of database connections 136, the connection management module 130 may establish and add multiple additional database connections 136 to the connection pool 108 because if a second connection is needed, then it is likely that the batch run is winding up and so the multiple additional database connections 136 may be needed.

The process 300 may be implemented in embodiments in which client application 104 tends to load gradually. For instance, the process 300 may be implemented in the client applications 104 in which a load reflects usage by a shopper. In these embodiments, the connection management module 130 may be configured to maintain a small number (e.g., two) of available database connections 136 at all times. For example, the minimum number of database connections 136 may be set to two. If one of the database connections 136 is used, the connection management module 130 may be configured to establish a replacement database connection and add it to the connection pool 108. As the database connections 136 are returned to the connection pool 108, the connection management module 130 may prune database connections 136 in excess of the minimum number.

Figure 4:
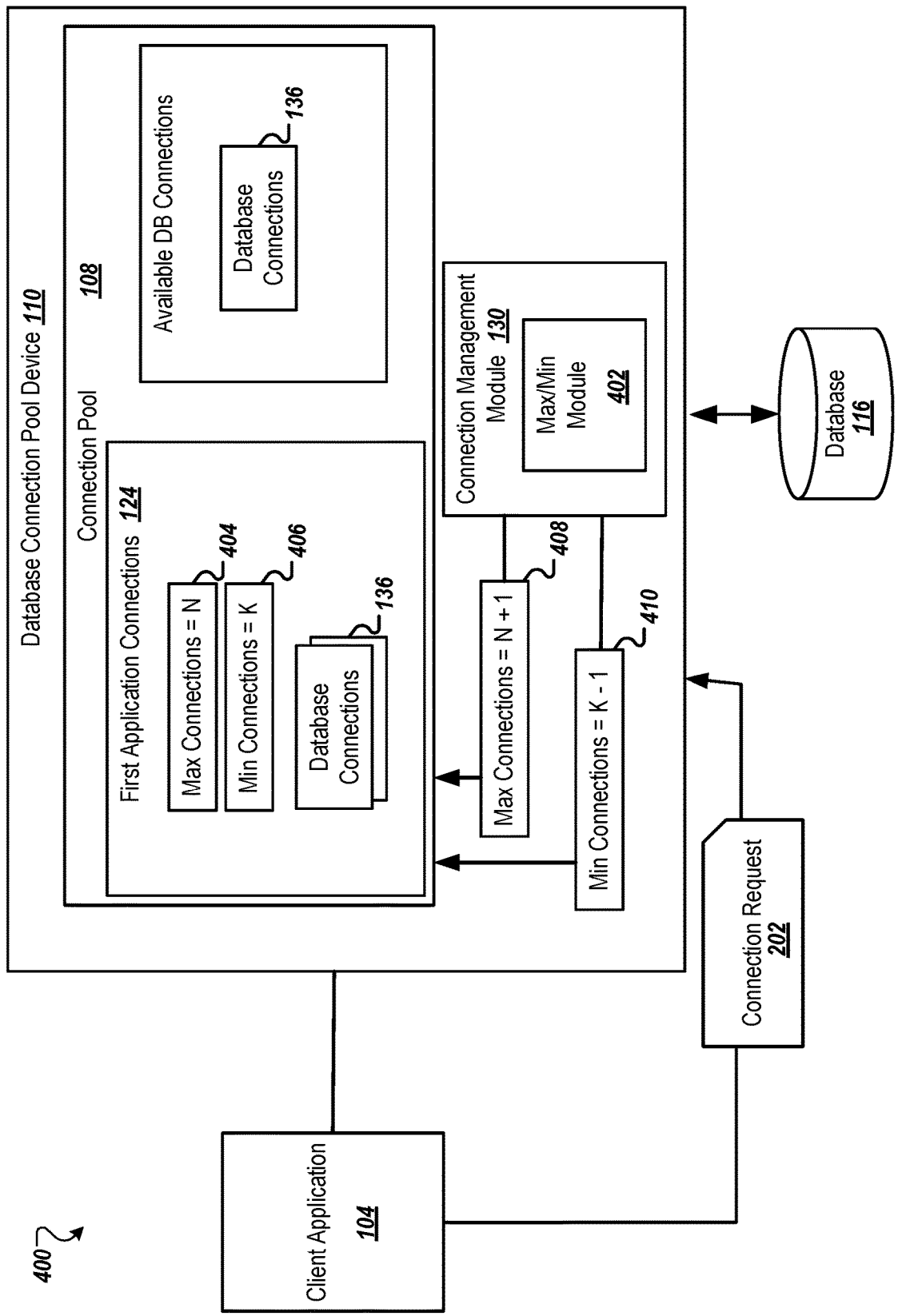
FIG. 4 is a diagram of an example process of changing a maximum number and a minimum number of database connections in use between a client application and a database that may be implemented in the system of FIG. 1.

FIG. 4 is a diagram of an example process 400 of changing maximum number and a minimum number of database connections 136 in use between the client application 104 and the database 116 in accordance with at least one embodiment described in the present disclosure. The process 400 of FIG. 4 may be implemented in the system 100 of FIG. 1. In FIG. 4, multiple components (e.g., 104, 130, 136, 108, and 110) are included that were described with reference to FIG. 1. The descriptions of these components are not repeated with reference to FIG. 4.

In the process 400, a maximum number 404 and a minimum number 406 of database connections 136 in use between the client application 104 and the database 116 may be changed. For instance, the maximum number 404 of database connections 136 in use between the client application 104 and the database 116 may be increased prior to a maximum number 404 of database connections 136 being assigned to the client application 104. Additionally, the minimum number 406 of database connections 136 in use between the client application 104 and the database 116 may be decreased prior to existence of a condition in which the client application 104 will use the database connections 136. Throughout the process 400, computing resources may be taken into consideration to avoid overwhelming the pool device 110.

The connection management module 130 may include a max/min module 402. The max/min module 402 may be configured to monitor the number of database connections 136 in use between the client application 104 and the database 116 relative to the maximum number 404 and/or the minimum number 406. The max/min module 402 may be further configured to monitor computing resources of the pool device 110.

The max/min module 402 may detect that the maximum number 404 of database connections 136 (in FIG. 4 "N") are in use between the client application 104 and the database 116. The max/min module 402 may assess computing resources in use by the pool device 110. In response to the maximum number 404 of the database connections 136 being in use and there being sufficient computing resources, the max/min module 402 may communicate a signal to the connection management module 130. In response to the signal, the connection management module 130 may increase the maximum number 404, which is represented in FIG. 4 by block 408. The increased maximum number 408 may enable an additional database connection 136 between the client application 104 and the database 116. Accordingly, connection delay due to exceeding the maximum number of database connections 136 allowed between the client application 104A and the database 116 may be avoided or reduced.

Subsequently, the max/min module 402 may detect a lack of use of one or more of the database connections 136. In response, the max/min module 402 may communicate a signal to the connection management module 130 indicating there are unused database connections 136. In response, the connection management module 130 may reduce the maximum number of database connections 136 (e.g., from N+1 to N) and prune one or more of the database connections 136.

Additionally, the max/min module 402 may detect a lack of use of one or more of the database connections 136. For instance, during periods of low traffic. In response, the max/min module 402 may communicate a signal to the connection management module 130 indicating there are unused database connections 136. In response, the connection management module 130 may reduce the minimum number of database connections 136 below the minimum number 406. The decreased minimum number is represented in FIG. 4 by block 410.

Subsequently, the max/min module 402 may detect use of one or more of the database connections 136. In response, the max/min module 402 may communicate a signal to the connection management module 130 indicating use of the database connections 136. In response, the connection management module 130 may increase the minimum number 410 of database connections 136 (e.g., from K−1 to K).

With reference to FIGS. 2, 3, and 4, although the processes 200, 300, and 400 are described independently, some combination of the processes 200, 300, and 400 may be implemented together in a single embodiment along with one or more other processes. Additionally, the processes 200, 300, and 400 are only examples of database connection management that may be implemented by the system 100 of FIG. 1. For instance, the process that may be implemented by the connection management module 130 may include: management of the database connections 136 based on computing resource allocation in the connection pool 108 (e.g., not to exceed a percentage of total computing resources), management of the database connections 136 based on computing resources allocation between a particular client application 104 and the database 116, management of the database connections 136 based on a priority arrangement between client applications 104 (e.g., database connections 136 are created for the first client application 104A prior to the second client application 104B), management of the database connections 136 based on a frequency or rate of change of received connection requests 202, management of the database connections 136 based on a number of connection requests 202 pending (e.g., if X connection requests 202 are pending, create X+3 database connections 136), management of the database connections 136 based on a number of connection requests 202 received from a particular client application 104, bandwidth in the system 100, computing resources used in the database 116, or any other suitable management process.

Moreover, the processes 200, 300, and 400 or any other management process may be updated or modified based on machine learning, predictive analysis, pattern recognition, algorithm chaining, or some combination thereof.

Figure 5A:
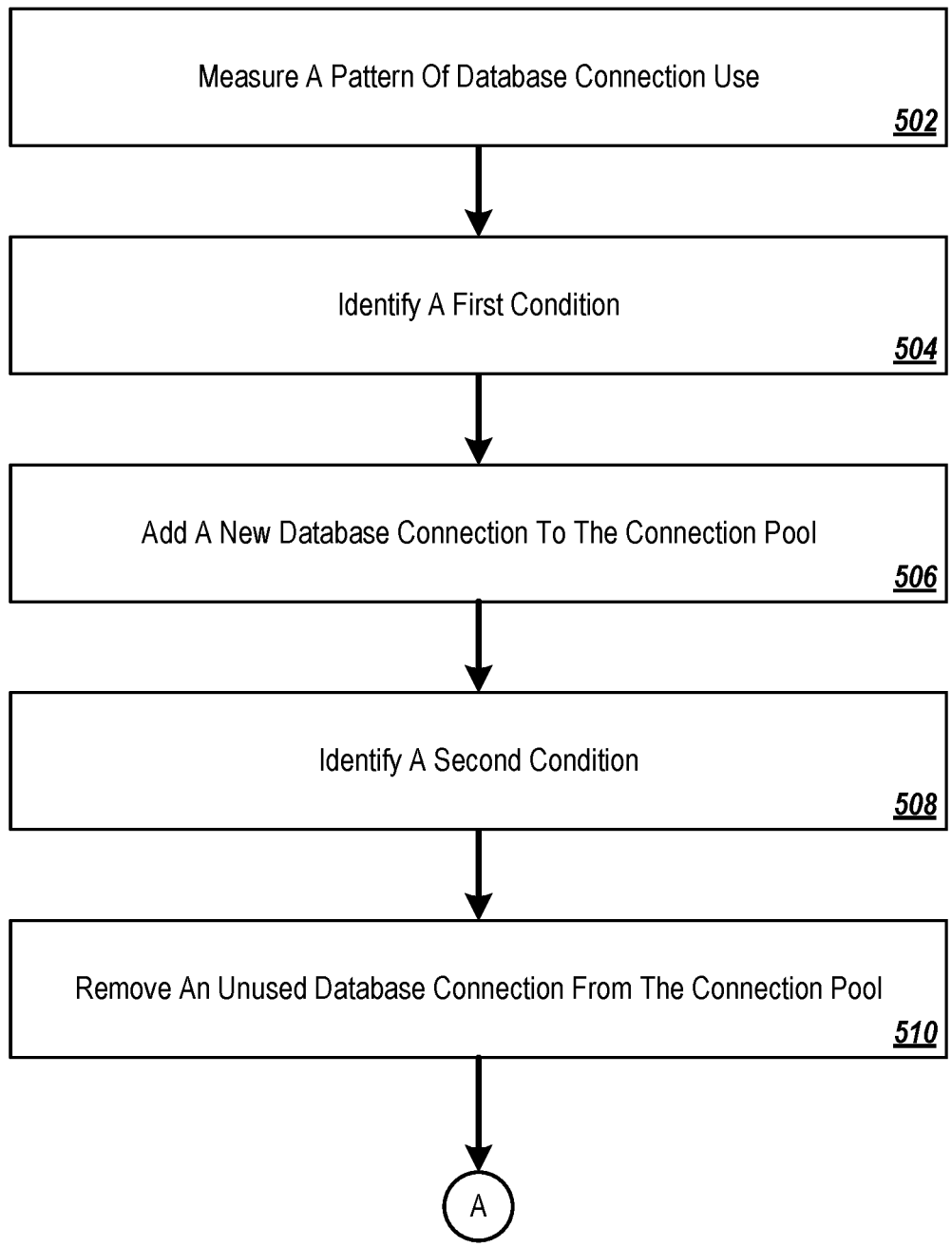
FIGS. 5A and 5B are a flow diagram illustrating an example method of database connection management.
Figure 5B:
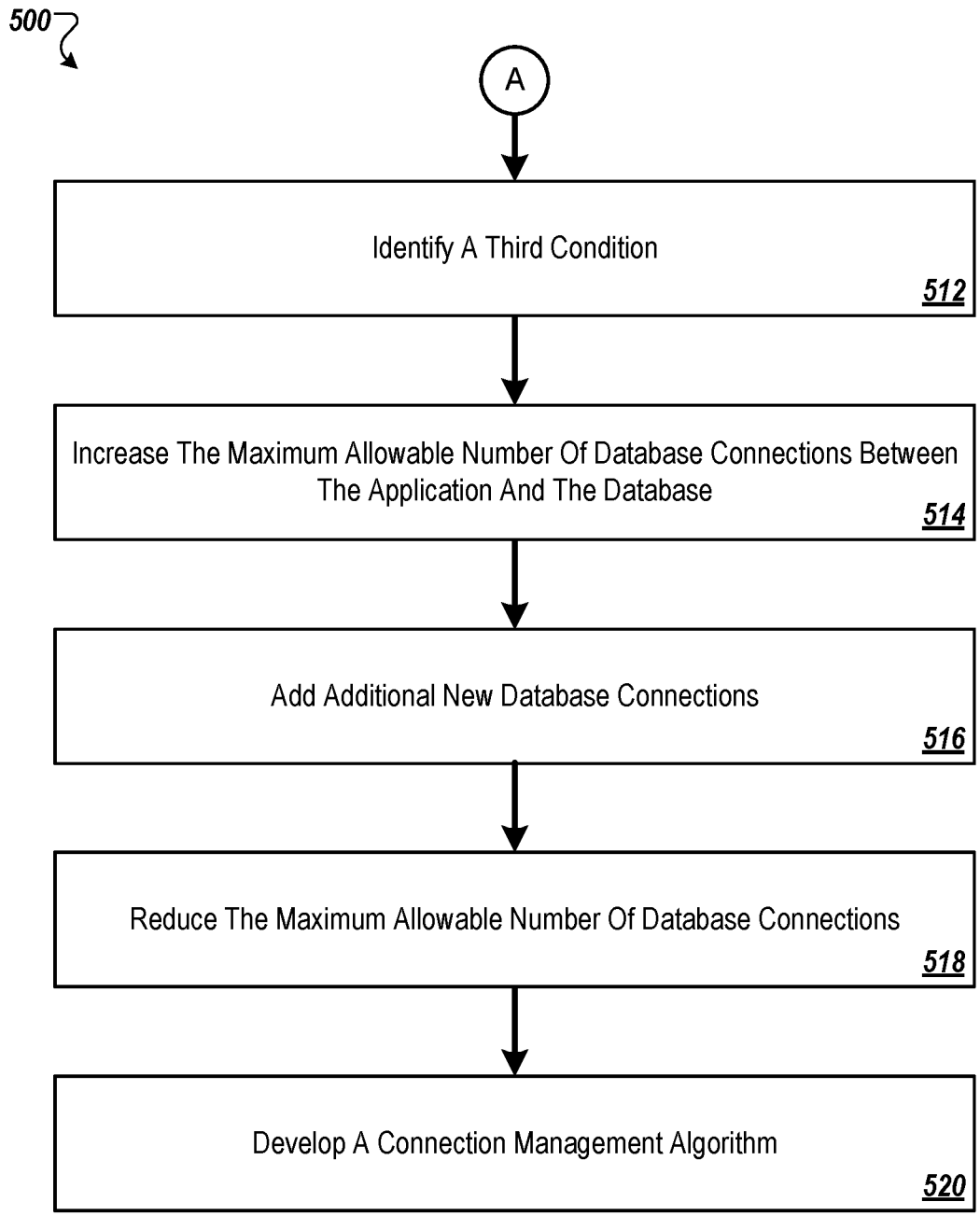

FIGS. 5A and 5B are a flow diagram illustrating an example method 500 of database connection management, according to at least one embodiment of the present disclosure. One or more operations of the method 500 may be performed by a system or device, such as connection management module 130 or by the pool device 110 described elsewhere in the present application. In these and other embodiments, the method 500 may be performed based on the execution of instructions stored on one or more non-transitory computer-readable media. Although illustrated as discrete blocks, various blocks of method 500 may be divided into additional blocks, combined into fewer blocks, or eliminated, depending on the desired implementation.

The method 500 may begin at block 502 in which a pattern of database connection use may be measured. The pattern of database connection use may be measured between a database and a client application. The pattern may include a number of database connections used by the client application under multiple conditions. The pattern may include a number of database connections in a connection pool under the multiple conditions. In some embodiments, the pattern may be measured between multiple applications and the database. In these and other embodiments, the measured pattern may be specific to each of the multiple applications.

At block 504, a first condition may be identified. The first condition may include a particular condition of the multiple conditions. The first condition may include a condition under which an increase in the number of database connections in the connection pool results in a decrease in connection delay. For example, in some embodiments, identification of the first condition may include determining circumstances in which a connection request is submitted by the client application and there are insufficient database connections in the connection pool to fulfill the connection request. Some examples of the first condition may include a particular time, a first connection request of a plurality of anticipated connection requests, a number of database connections in the connection pool, or some combination thereof.

At block 506, a new database connection may be added to the connection pool. For instance, in response to existence of the first condition, the new database connection may be added to the connection pool. The new database connection may be added such that the new database connection is available to the client application in advance of a connection request for the new database connection.

At block 508, a second condition may be identified. For example, the second condition may be identified based on the measured pattern. The second condition may include a condition at which a decrease in the number of database connections in the connection pool results in a decrease in computing resources used to maintain unused database connections in the connection pool. At block 510, an unused database connection may be removed from the connection pool. For instance, in response to the existence of the second condition, an unused database connection may be removed from the connection pool.

At block 512, a third condition may be identified. For example, the third condition may be identified based on the measured pattern. The third condition may include a condition at which an increase in a maximum allowable number of database connections between the client application and the database results in a decrease in the connection delay. At block 514, the maximum allowable number of database connections between the client application and the database may be increased. For example, the maximum allowable number of database connections may be increased during existence of the third condition.

At block 516, additional new database connections may be added to the connection pool. The additional new database connections may be added to the connection pool during the existence of the third condition. The new database connections may be added such that the additional new database connections are available to the client application in advance of connection requests for the additional new database connections. At block 518, the maximum allowable number of database connections between the client application and the database may be reduced. In some embodiments, the maximum allowable number of database connections between the client application and the database may be reduced following the existence of the third condition.

At block 520, a connection management algorithm may be developed. The connection management algorithm may be developed according to which the new database connection is added to the connection pool based on the measured pattern. In some embodiments, the connection management algorithm is configured to manage a number of database connections according to time, manage the number of database connections to include a minimum number of database connections and particular number of buffer database connections, maintain the number of database connections between a minimum number of database connections and a maximum number of database connections, maintain a minimum number of database connections available in the pool, or some combination thereof.

Figure 6:
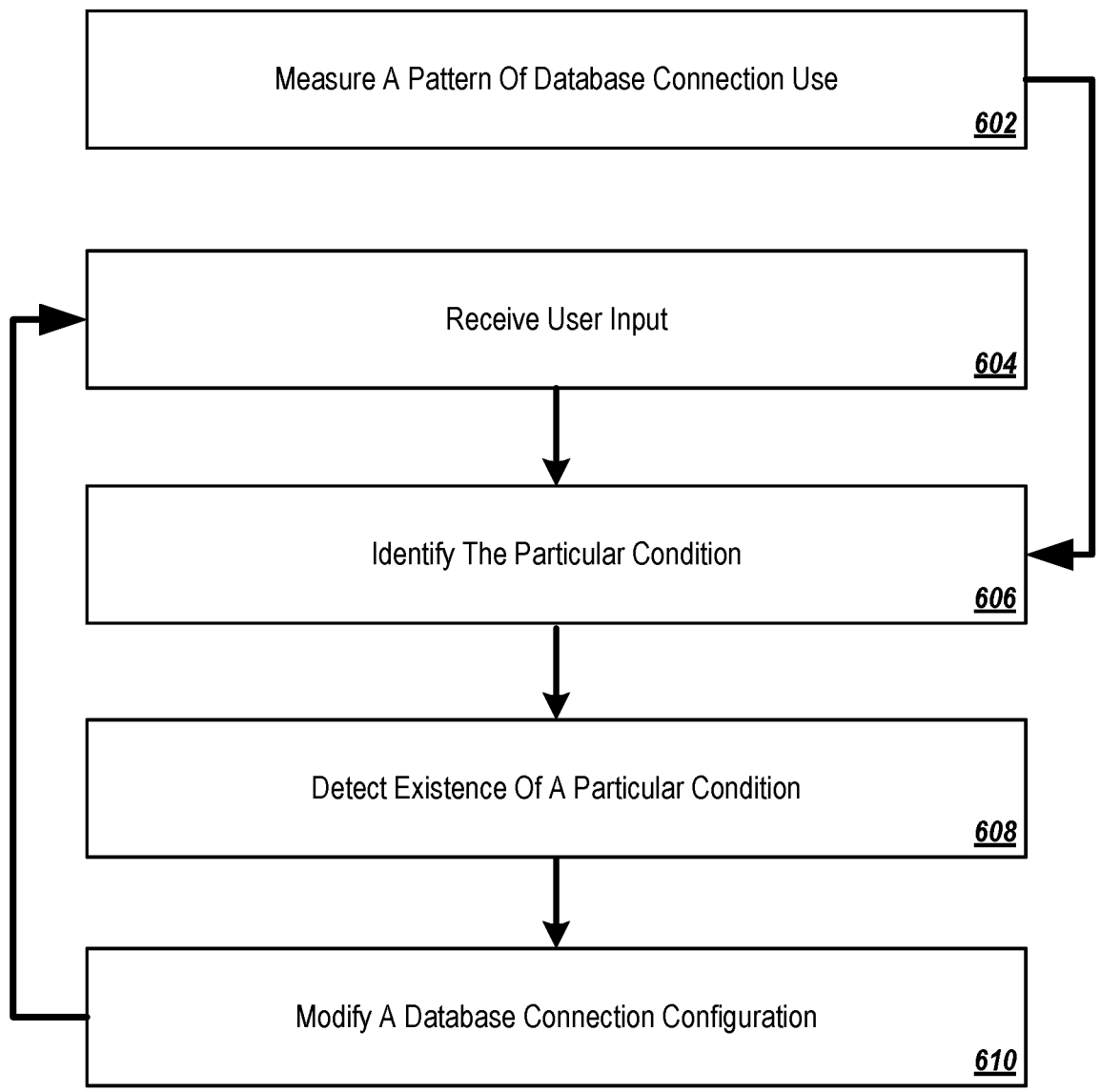
FIG. 6 is a flow diagram illustrating another example method of database connection management.

FIG. 6 is a flow diagram illustrating an example method 600 of database connection management, according to at least one embodiment of the present disclosure. One or more operations of the method 600 may be performed by a system or device, such as connection management module 130 or by the pool device 110 described elsewhere in the present application. In these and other embodiments, the method 600 may be performed based on the execution of instructions stored on one or more non-transitory computer-readable media. Although illustrated as discrete blocks, various blocks of method 600 may be divided into additional blocks, combined into fewer blocks, or eliminated, depending on the desired implementation.

The method 600 may begin at block 602 in which a pattern of database connection use may be measured. The database connection use may be between a database and a client application. The pattern may include a number of database connections used by the client application under multiple conditions. The pattern may include a number of database connections in a connection pool under the multiple conditions.

The method 600 may alternatively begin at block 604 in which user input may be received. In some embodiments, blocks 602 and 604 may be performed simultaneously or may have some overlapping duration.

At block 606, a particular condition may be identified. In some embodiments, the particular condition may be identified based on the measured pattern. For instance, the particular condition may be identified based on a number of database connections in use and/or the measured number of connections in the connection pool. Additionally or alternatively, the user input may identify the particular condition.

At block 608, existence of a particular condition may be detected. The particular condition may include a condition that results in an introduction of an inefficiency in database connection configuration between the client application and the database. In some embodiments, the particular condition may include a first condition under which an increase in the number of database connections in the connection pool results in a decrease in connection delay, a second condition at which a decrease in the number of database connections in the connection pool results in a decrease in computing resources used to maintain unused database connections in the connection pool, a third condition at which an increase in the number of database connections between the client application and the database results in a decrease in the connection delay, a fourth condition at which a decrease in the number of database connections between the client application and the database results in a decrease in computing resources used to maintain unused database connections between the client application and the database, or some combination thereof. Some example of the particular condition may include a particular time, a first connection request of a plurality of anticipated connection requests, a number of database connections in the connection pool, or some combination thereof.

At block 610, the database connection configuration may be modified. The database connection configuration may be modified to avoid the introduction of the inefficiency. The database connection configuration may be modified in response to existence of the particular condition. Modification of the database connection configuration may include a change to a number of database connections in a connection pool and/or a change in a number of database connections between the client application and the database.

In some embodiments, the changing of the number of database connections includes adding a new database connection to the connection pool such that the new database connection is available to the client application in advance of a connection request for the new database connection, removing an unused database connection from the connection pool, increasing a maximum number of database connections between the database and the client application, decreasing a minimum number of database connections between the database and the client application, or some combination thereof.

Following block 610, the method 600 may proceed to one or more of blocks 604, 606, 608, 610, or some combination thereof. For instance, in some embodiments, some additional user input may be received as described with reference to block 604. In these and other embodiments the user input may update the particular condition and/or may specify a change to the number of database connections.

Figure 7:
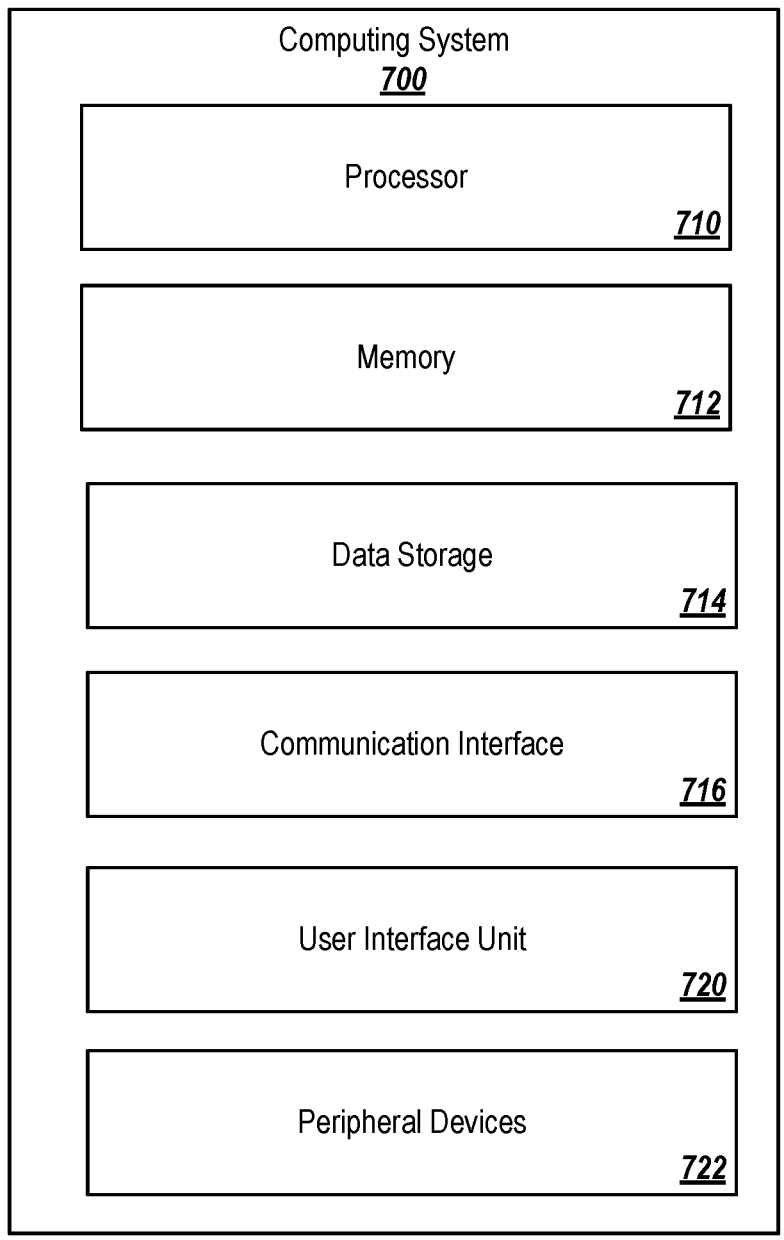
FIG. 7 is a diagram of an example computing system that may be used in database connection management.

FIG. 7 is a diagram of an example computing system 700 ("system 700") that may be used in database connection management, in accordance with one or more embodiments of the present disclosure. The system 700 may include a processor 710, a memory 712, data storage 714, a communication interface 716, a user interface unit 720, and peripheral devices 722, which all may be communicatively coupled. In some embodiments, at least a portion of the system 700 may be part of any of the systems or devices described in this disclosure. For example, the system 700 may be included in or part of the pool device 110, the client devices 102, the application servers 105, the database management device 144, or the database 116 described elsewhere in the present disclosure.

Generally, the processor 710 may include any suitable computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of networks or physical locations that are configured to perform individually or collectively any number of operations described herein. In some embodiments, the processor 710 may interpret and/or execute program instructions and/or process data stored in the memory 712, the data storage 714, or the memory 712 and the data storage 714. In some embodiments, the processor 710 may fetch program instructions from the data storage 714 and load the program instructions into the memory 712.

After the program instructions are loaded into the memory 712, the processor 710 may execute the program instructions. In these and other embodiments, the connection management module 130 of FIGS. 1-4 may be stored in the memory 712 and/or the data storage 714 and may be loaded and executed by the processor 710 to perform operations with respect to database connection management.

The memory 712 and the data storage 714 may include computer-readable storage media or one or more computer-readable storage media for carrying or having computer-executable instructions or data structures stored thereon. Such computer-readable storage media may include any available media that may be accessed by a general-purpose or special-purpose computer, such as the processor 710. By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform or control performance of a certain operation or group of operations as describe in this disclosure.

The communication interface 716 may include any component, device, system, or combination thereof that is configured to transmit or receive information over a network. In some embodiments, the communication interface 716 may communicate with other devices at other locations, the same location, or even other components within the same system. For example, the communication interface 716 may include a modem, a network card (wireless or wired), an infrared communication device, a wireless communication device (such as an antenna), and/or chipset (such as a Bluetooth device, near-field communication (NFC) device, an 802.6 device (e.g., Metropolitan Area Network (MAN)), a Wi-Fi device, a WiMax device, cellular communication facilities, etc.), and/or the like. The communication interface 716 may permit data to be exchanged with a network and/or any other suitable devices or systems, such as those described in the present disclosure. For example, in embodiments in which the system 700 is included in the pool device 110, of FIG. 1, the communication interface 716 may allow the pool device 110 to communicate with the application servers 105 and the database 116.

The user interface unit 720 may include any device to allow a user to interface with the system 700. For example, the user interface unit 720 may include a mouse, a track pad, a keyboard, and/or a touchscreen, among other devices. The user interface unit 720 may receive input from a user and provide the input to the processor 710.

The peripheral devices 722 may include one or more devices. For example, the peripheral devices may include a microphone, an optical scanner, and/or a speaker, among other peripheral devices. In these and other embodiments, the microphone may be configured to capture audio. The optical scanner may be configured to capture depictions, such as digital images, infrared scans, and/or others. The digital images may be captured in a manner to produce video or image data. In some embodiments, the speaker may broadcast audio received by the system 700 or otherwise generated by the system 700.

The system 700 may include or be included in a mobile device (such as a cellular telephone, e-reader, mobile gaming system, laptop, and/or others), a desktop computer, a server computer, an Internet connected device (e.g., a thermostat, security system, refrigerator, and/or others), wearable devices (e.g., a smart watch, smart glasses, fitness tracker, and/or others), or any other device.

One skilled in the art, after reviewing this disclosure, may recognize that modifications, additions, or omissions may be made to the system 700 without departing from the scope of the present disclosure. For example, the system 700 may include more or fewer components than those explicitly illustrated and described.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of database connection management, the method comprising:
   measuring, by a database connection pool device that is communicatively coupled between an application server and a database, a plurality of patterns with respect to database connection use between the database and a client application hosted by the application server, the plurality of patterns including:
      first relationships between a number of database connections used by the client application and a number of database connections included in a connection pool that includes database connections that are reserved for at least two different client applications; and
      second relationships between a number of database connections reserved for the client application in the connection pool and a number of database connections used by the client application;
      wherein different ones of the plurality of patterns record the relationships using different time granularities;
   identifying, by the database connection pool device based on the first and second relationships of at least one of the plurality of patterns, a first condition; and
   in response to detecting a current existence of the first condition, decreasing a number of reserved but currently unused database connections for the client application.

2. The method of claim 1, further comprising:
   in response to detecting the current existence of the first condition, adding, by the database connection pool device, one or more database connections to the connection pool, such that the currently unused database connections for the client application and the one or more added database connections are available in the connection pool to another client application in advance of a connection request from the other client application.

3. The method of claim 1, wherein identifying the first condition includes determining that the number of database connections in the connection pool is lower than a maximum allowable number of database connections in the connection pool, the method further comprising:
   based on at least one of the plurality of patterns, identifying a second condition at which a decrease in the number of database connections in the connection pool results in a decrease in computing resources used to maintain unused database connections in the connection pool; and
   in response to detecting a current existence of the second condition, removing an unused database connection from the connection pool.

4. The method of claim 3, further comprising:
   based on at least one of the plurality of patterns, identifying a third condition at which an increase in a maximum allowable number of database connections between the client application and the database results in a decrease in the connection delay; and
   in response to detecting a current existence of the third condition:
      increasing the maximum allowable number of database connections between the client application and the database; and adding additional new database connections to the connection pool such that the additional new database connections are available to the client application in advance of connection requests for the additional new database connections; and in response to detecting that the third condition no longer exists, reducing the maximum allowable number of database connections between the client application and the database.

5. The method of claim 1, wherein the identifying the first condition includes determining circumstances under which connection requests are submitted when there are insufficient database connections in the connection pool to fulfill the connection request, and wherein the decreasing is performed based on a connection management algorithm.

6. The method of claim 5, wherein the connection management algorithm is configured to:
manage a number of database connections according to time;
manage the number of database connections to include a minimum number of database connections and a particular number of buffer database connections;
maintain the number of database connections between a minimum number of database connections and a maximum number of database connections; and
maintain a minimum number of database connections available in the connection pool.

7. The method of claim 1, wherein the measuring the plurality of patterns with respect to the client application includes at least:
measuring a first pattern that indicates one of the first relationships at different times of the day; and
measuring a second pattern that indicates one of the first relationships at different days of the week.

8. A database connection management system, comprising:
a client application hosted by an application server;
a connection pool that is communicatively coupled to a database;
at least one processor; and
a memory having instructions stored thereon that are executable by the at least one processor to cause the system to:
measure a plurality of patterns with respect to database connection use between the database and the client application, the plurality of patterns including:
first relationships between a number of database connections used by the client application and a number of database connections included in the connection pool that includes database connections that are reserved for at least two different client applications; and
second relationships between a number of database connections reserved for the client application in the connection pool and a number of database connections used by the client application;
wherein different ones of the patterns record the relationships using different time granularities;
detect a current existence of a first condition under which an increase in a number of database connections in the connection pool results in a decrease in connection delay, wherein the first condition is detected based on the first and second relationships of at least one of the plurality of patterns; and in response to detecting the current existence of the first condition, decreasing a number of reserved but currently unused database connections for the client application.

9. The system of claim 8, wherein the instructions are further executable by the at least one processor to:
detect a current existence of a second condition at which a decrease in the number of database connections in the connection pool results in a decrease in computing resources used to maintain unused database connections in the connection pool, wherein the second condition is identified based on at least one of the plurality of patterns;
in response to detecting the current existence of the second condition, remove an unused database connection from the connection pool;
detect a current existence of a third condition at which an increase in the number of database connections between the client application and the database results in a decrease in the connection delay, wherein the third condition is identified based on at least one of the plurality of patterns; and
in response to detecting the current existence of the third condition, increase a maximum number of database connections between the database and the client application.

10. The system of claim 9, wherein the instructions are further executable by the at least one processor to:
receive user input, wherein the user input identifies one or more or a combination of the first condition, the second condition, and the third condition.

11. The system of claim 9, wherein the instructions are further executable by the at least one processor to:
update one or both of the first condition and the second condition;
detect a current existence of a fourth condition at which a decrease in the number of database connections between the client application and the database results in a decrease in computing resources used to maintain unused database connections between the client application and the database, wherein the fourth condition is identified based on at least one of the plurality of patterns; and
in response to detecting the current existence of the fourth condition, decrease a minimum number of database connections between the database and the client application.

12. The system of claim 8, wherein the first condition further includes one or more or a combination of:
a number of received connection requests;
a number of database connections available in the connection pool; and
a computing resource allocated to database connections between the database and the client application.

13. The system of claim 8, wherein:
the client application is a first application of a plurality of applications;
the connection pool is communicatively coupled to the plurality of applications; and wherein the instructions are further executable by the at least one processor to:
detect a current existence of a fifth condition under which an increase in the number of database connections in the connection pool results in a decrease in connection delay between a second application of the plurality of applications and the database, wherein the fifth condition is identified based on at least one of the plurality of patterns; and in response to detecting the current existence of the fifth condition, add another new database connection to the connection pool in advance of a connection request for the other new database connection from the second application.

14. The system of claim 8, wherein the measuring the plurality of patterns with respect to the client application includes at least:
    measuring a first pattern that indicates one of the second relationships at different times of the day; and
    measuring a second pattern that indicates one of the second relationships at different dates of the year.

15. A device comprising:
    one or more non-transitory computer-readable storage media storing instructions; and
    one or more processors configured to execute the instructions to cause the device to perform operations, the operations comprising:
        measuring a plurality of patterns with respect to database connection use between a database and a client application hosted on an application server, the plurality of patterns including:
        first relationships between a number of database connections used by the client application and a number of database connections included in a connection pool that includes database connections that are reserved for at least two different client applications; and
        second relationships between a number of database connections reserved for the client application in the connection pool and a number of database connections used by the client application;
        wherein different ones of the patterns record the relationships using different time granularities;
        identifying, based on the first and second relationships of at least one of the plurality of patterns, a particular condition; and
        in response to determining a current existence of the particular condition, decreasing a number of reserved but currently unused database connections for the client application.

16. The device of claim 15, wherein the particular condition includes one or more of the following types of conditions:
    a first condition under which an increase in the number of database connections in the connection pool results in a decrease in connection delay;
    a second condition at which a decrease in the number of database connections in the connection pool results in a decrease in computing resources used to maintain unused database connections in the connection pool;
    a third condition at which an increase in the number of database connections between the client application and the database results in a decrease in the connection delay; and
    a fourth condition at which a decrease in the number of database connections between the client application and the database results in a decrease in computing resources used to maintain unused database connections between the client application and the database.

17. The device of claim 15, wherein the particular condition includes:
    a first connection request of a plurality of anticipated connection requests; and
    a number of database connections in the connection pool.

18. The device of claim 15, further comprising:
    in response to the determining, changing the number of database connections, wherein the changing includes one or more or a combination of:
        adding a new database connection to the connection pool such that the new database connection is available to the client application in advance of a connection request for the new database connection;
        removing an unused database connection from the connection pool;
        increasing a maximum number of database connections between the database and the client application; and
        decreasing a minimum number of database connections between the database and the client application.

19. The device of claim 15, wherein the operations further comprise receiving user input, wherein the user input identifies the particular condition, updates the particular condition, or specifies a change to the number of database connections.

20. The device of claim 15, wherein the measuring the plurality of patterns with respect to the client application includes at least:
    measuring a first pattern that indicates one of the second relationships at different days of the week; and
    measuring a second pattern that indicates one of the second relationships at different times of day.

* * * * *